(12) United States Patent
Schuler

(10) Patent No.: US 10,290,163 B2
(45) Date of Patent: May 14, 2019

(54) CONNECTED VEHICLE COMMUNICATION PORT INTEGRATED UNIVERSAL GARAGE DOOR OPENER

(71) Applicant: VALEO COMFORT AND DRIVING ASSISTANCE, Créteil (FR)

(72) Inventor: Stephane Schuler, Shenzhen (CN)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/634,407

(22) Filed: Jun. 27, 2017

(65) Prior Publication Data

US 2018/0374291 A1 Dec. 27, 2018

(51) Int. Cl.
*G07C 9/00* (2006.01)
*E04H 6/02* (2006.01)
*B60R 16/02* (2006.01)

(52) U.S. Cl.
CPC .......... *G07C 9/00309* (2013.01); *E04H 6/02* (2013.01); *B60R 16/02* (2013.01); *G07C 2009/00928* (2013.01)

(58) Field of Classification Search
CPC .......... B60R 16/02; G07C 2009/00928; G07C 9/00182; G07C 9/00896; G07C 9/00309; E05F 15/668; E04H 6/02

USPC ................................................. 340/5.71, 438
See application file for complete search history.

(56) References Cited

U.S. PATENT DOCUMENTS

| | | | |
|---|---|---|---|
| 2005/0026605 A1* | 2/2005 | Guthrie | G07C 9/00182 455/420 |
| 2010/0060505 A1* | 3/2010 | Witkowski | G08C 17/02 341/176 |
| 2010/0171588 A1* | 7/2010 | Chutorash | G07C 9/00182 340/5.71 |
| 2010/0289618 A1* | 11/2010 | Crucs | G08C 17/00 340/5.61 |
| 2014/0300457 A1* | 10/2014 | Geerlings | G07C 9/00309 340/438 |

* cited by examiner

*Primary Examiner* — Mohamed Barakat
(74) *Attorney, Agent, or Firm* — Osha Liang LLP

(57) ABSTRACT

A universal garage door opener (UGDO) system for a vehicle is disclosed. The UGDO system includes one or more transceivers configured to transmit and receive UGDO data via one or more antennas, a microcontroller operable to control the one or more transceivers to implement UGDO functionality, and a vehicle interface configured to exchange signals between the microcontroller and at least one vehicle subsystem of the vehicle, wherein at least the one or more antennas, the microcontroller, and the vehicle interface are embedded into and integrated with connected vehicle communication port positioned in proximity to a roof of the vehicle.

12 Claims, 6 Drawing Sheets

CONNECTED VEHICLE COMMUNICATION PORT INTEGRATED UNIVERSAL GARAGE DOOR OPENER

BACKGROUND OF INVENTION

In many regions around the world, it is common to have a garage door opening system motorized and remotely controllable from the vehicle, also known as a universal garage door opening (UGDO) system. The UGDO system typically includes a garage door opener located within the vehicle, for example on the rearview mirror interior of the vehicle, which is programmable to learn the characteristics of the garage door signal which a garage door transceiver expects to receive for controlling the garage door. The garage door opener features a learning mode, which may be entered by using a dedicated Human Machine Interface (HMI). In learning mode, the garage door opener scans the garage door signal from the handheld remote terminal to learn its characteristics and credentials. Subsequently, when prompted by the user, the garage door opener wirelessly transmits a signal having the characteristics and credentials of the handheld remote terminal to the garage door receiver that controls the garage door. When trained, it is no longer needed to carry along the handheld remote terminal or leave it in the vehicle, which is good for theft prevention.

With the development of Camera Monitoring Systems in vehicles, rear view mirrors are starting to integrate more high frequency operating electronic functions (e.g., cameras, TFT displays with image processing capability, eC mirrors, etc.). This new integration interference with the RF transceivers may undermine the UGDO performance, reducing significantly the operating range of the UGDO functionality, which is one of the main features of the system.

SUMMARY OF INVENTION

In general, in one aspect, the invention relates to a universal garage door opener (UGDO) system for a vehicle, comprising one or more transceivers configured to transmit and receive UGDO data via one or more antennas, a microcontroller operable to control the one or more transceivers to implement UGDO functionality, and a vehicle interface configured to exchange signals between the microcontroller and at least one vehicle subsystem of the vehicle, wherein at least the antennas, the microcontroller, and the vehicle interface are embedded into and integrated with connected vehicle communication port positioned in proximity to a roof of the vehicle.

In general, in one aspect, the invention relates to a vehicle control system for a vehicle, comprising a sharkfin antenna positioned exterior to and on a roof of the vehicle, the sharkfin antenna comprising at least one vehicle subsystem module including a sub-GHz transceiver configured to operate at a single frequency below 1 GHz, a microcontroller operable to control the sub-GHz transceiver, and a vehicle interface configured to exchange signals between the microcontroller and the at least one vehicle subsystem, wherein the at least one vehicle subsystem module is augmented to comprise universal garage door opener (UGDO) functionality by embedding a Wi-Fi transceiver into the sharkfin antenna, adapting the sub-GHz transceiver to operate bi-directionally at a plurality of frequencies below 1 GHz, upgrading the microcontroller to include UGDO functionality and to communicate with the Wi-Fi transceiver, and modifying the vehicle interface to accommodate a human-machine interface (HMI) command to be transferred to the vehicle subsystem module.

In general, in one aspect, the invention relates to a vehicle control system for a vehicle, comprising a telematics control unit (TCU) capable of UGDO functionality, comprising one or more transceivers configured to transmit and receive UGDO data via one or more antennas, a microcontroller operable to control the one or more transceivers to implement the UGDO functionality, and a vehicle interface configured to exchange signals between the microcontroller and at least one vehicle subsystem of the vehicle, a connected vehicle communication port separate from the TCU operably connected to the vehicle, comprising the one or more antennas, wherein the TCU is mounted in the vehicle in physical proximity to the connected vehicle communication port.

DETAILED DESCRIPTION

Figure 1A:
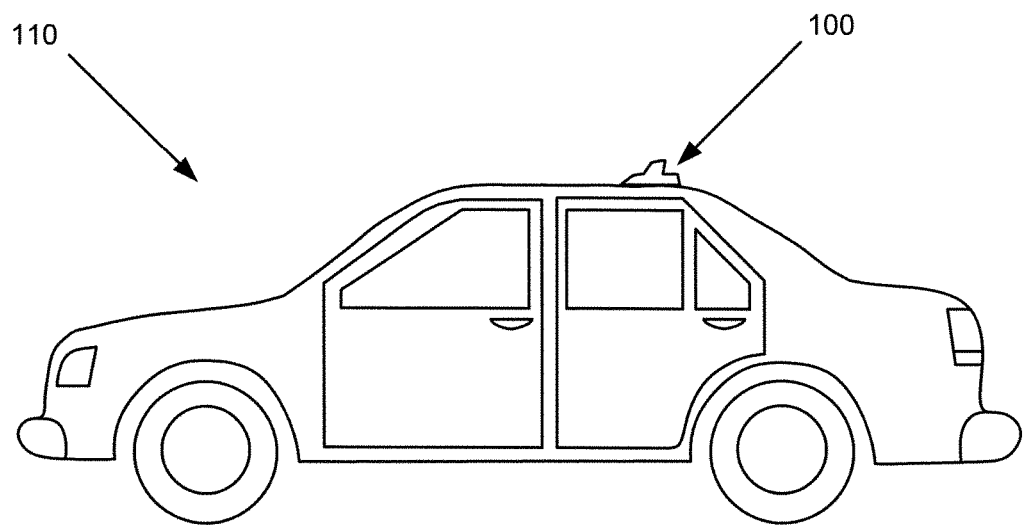
FIGS. 1A and 1B show examples of a connected vehicle communication port in accordance with one or more embodiments of the invention.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Those skilled in the art would appreciate how the term motor vehicle hereinafter may be understood to be a truck, a car, sport utility vehicle or suburban utility vehicle (SUV), or any known automobile in the art. As used herein, the term "coupled" or "coupled to," "operable to" or "operatively connected to," or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Embodiments of the invention relate to relocating the transceiver functions of the universal garage door opening (UGDO) system to a location that is better suited to its range performance, without the need to use external antennas connected with coaxial cables and wired to the interior rear view mirror. More specifically, one or more embodiments relocate at least some or all of the UGDO hardware to another module in the vehicle where a significant number of other wired or wireless communication functions are embedded. This module is referred to generally as a connected vehicle communication port throughout the present disclosure. For example, in one or more embodiments, a connected vehicle communication port may be a telematics control unit (TCU) located in the interior of the vehicle under the roof of the vehicle, a sharkfin antenna, located exterior to the vehicle also on the roof of the vehicle, a GPS receiver, a satellite radio module, a wireless transceiver unit, a vehicle-to-infrastructure module, or any other suitable vehicle subsystem operatively connected to the vehicle and capable of supporting UGDO functionality.

Figure 1B:
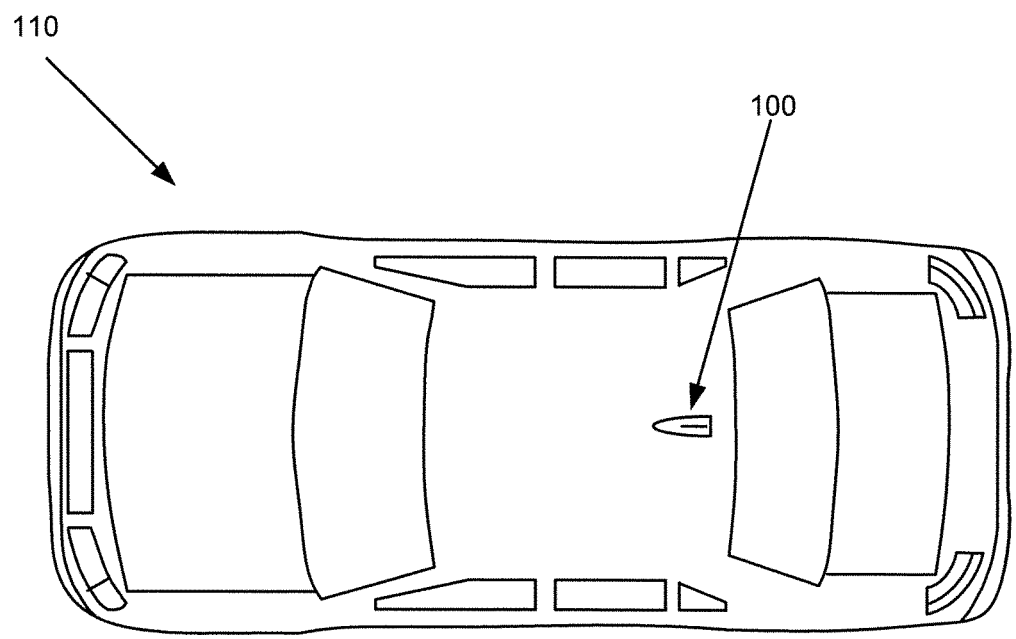

FIGS. 1A and 1B show an example of a connected vehicle communication port capable of supporting UGDO functionality in accordance with one or more embodiments of the invention. Specifically, FIG. 1A shows a side view diagram of connected vehicle communication port (100) on a vehicle (110), while FIG. 1B shows a top view diagram of connected vehicle communication port (100) disposed on a vehicle (110), respectively.

As shown in FIG. 1A-1B, in one or more embodiments, the connected vehicle communication port (100) may be a physical device configured to be disposed on a fuselage (i.e., on the main body) of a vehicle (110). For example, the connected vehicle communication port (100) may be disposed on a roof of the vehicle, as shown in FIGS. 1A and 1B, or any suitable elevated location for optimal RF performance. In other embodiments, the connected vehicle communication port (100) may be in proximity to the roof of the vehicle. This may be any location on the upper, back part of the vehicle, e.g., inside the vehicle and underneath the roof. The connected vehicle communication port (100) may be disposed either external to or internal to the vehicle. In another embodiment, a first portion of the connected vehicle communication port (100) is disposed inside the vehicle, while a second portion of the connected vehicle communication port (100) is disposed outside of the vehicle. Further, more than one connected vehicle communication port (100) may be disposed on a vehicle without departing from the invention. Further, those skilled in the art will appreciate that the connected vehicle communication port (100) may be mounted to any part of the vehicle (e.g., the front windshield, the front end, the back bumper, on the side doors, or any other structural member of the vehicle) without departing from the scope of the invention.

In one or more embodiments of the invention, the connected vehicle communication port (100) may have a shape of a sharkfin. Shaping the connected vehicle communication port (100) as a sharkfin may decrease wind resistance of the vehicle (110) caused by the connected vehicle communication port (100) when compared to other shapes such as a cube while providing sufficient height to house electronic elements such as antennas. Those skilled in the art will appreciate that the connected vehicle communication port (100) may take any form/shape suitable for housing UGDO functionality, and that the invention is not limited to a sharkfin configuration. For example, the connected vehicle communication port (100) may be any aerodynamic or aesthetically desirable shape, such as a cube, a blade, a spoiler, etc. In alternate embodiments, the connected vehicle communication port (100) may be a seamless variant of any of the aforementioned shapes/styles, in which no visible features are present. In one or more embodiments of the invention, the connected vehicle communication port (100) may have a shape that conforms to the contours of a vehicle. Shaping the connected vehicle communication port (100) to conform to the contours of a vehicle may decrease wind resistance of the vehicle caused by the connected vehicle communication port (100) when compared to other shapes that do not conform to the contours of the vehicle.

The connected vehicle communication port (100) may include hardware, software, firmware, or a combination of any of these, to support various vehicle subsystems. For example, the connected vehicle communication port (100) may support wireless vehicle communication (e.g., a Bluetooth/WiFi hotspot), GPS, vehicle-to-infrastructure (V2X), satellite radio, remote keyless entry (RKE), tire pressure and monitoring system (TPMS), telematics control unit (TCU), vehicle cameras configured to capture a scene exterior of the vehicle, or any other functionality that the vehicle is equipped with.

In one or more embodiments, the connected vehicle communication port (100) supports UGDO functionality. That is, either in addition to or instead of the aforementioned vehicle equipment, the connected vehicle communication port (100) facilitates/enables UGDO functionality for a driver of the vehicle. More specifically, the connected vehicle communication port (100) may house one or more of the hardware components required to support UGDO functionality. This may include, in one or more embodiments, hardware, software, and/or firmware for communication exchange with a human-machine interface (HMI), a Radio Frequency (RF) sub-GHz transceiver, suited to establish a bi-directional communication with the garage door opener (GDO) unit, and a Bluetooth/WiFi transceiver, suited to link the GDO unit to the HMI. Thus, in one or more embodiments, all or a portion of one or more transceivers, antennas corresponding to the transceivers, one or more processors/microcontrollers, and one or more vehicle interfaces may be housed in the connected vehicle communication port (100). In addition, the connected vehicle communication port (100) may support one or more suitable protocols for communication exchange between the UGDO functionality and other vehicle subsystems, such as a human-machine interface (HMI) subsystem.

Figure 2:
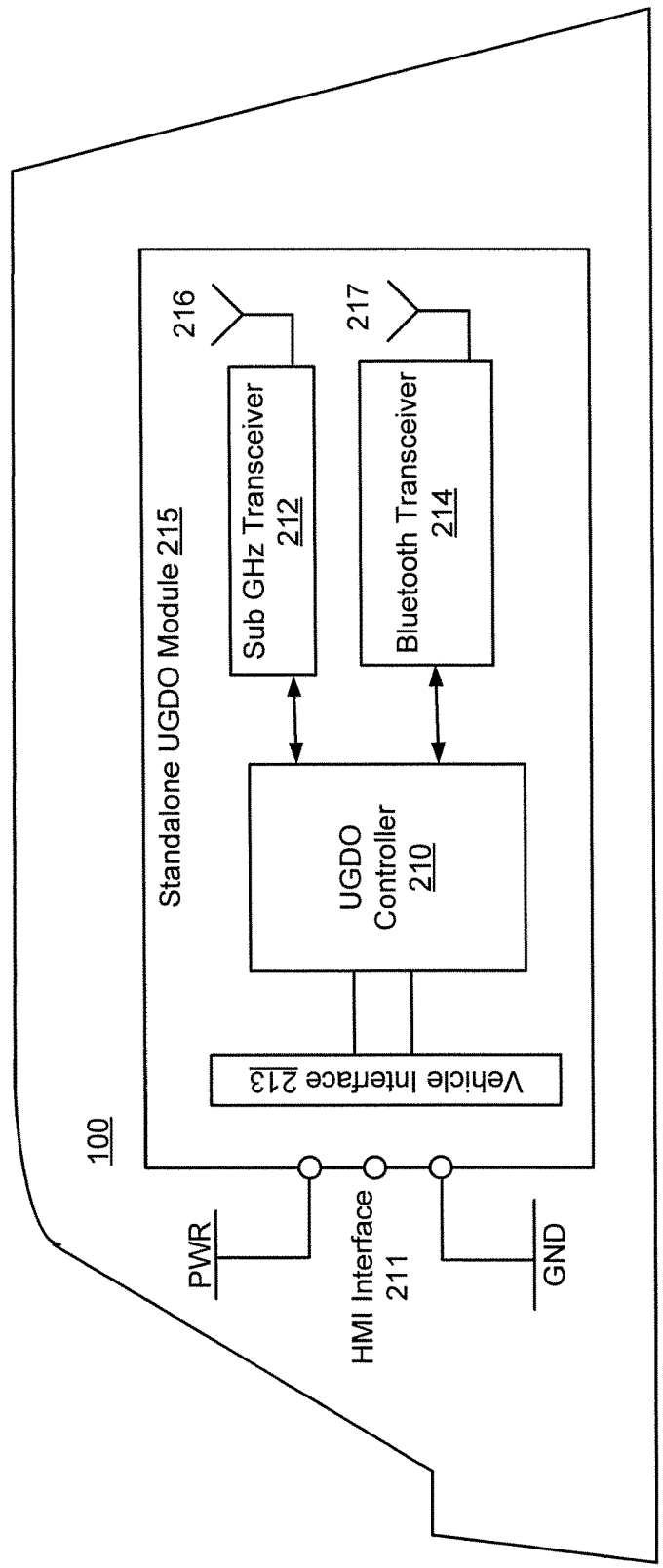
FIG. 2 shows a universal garage door opening (UGDO) unit embedded into a connected vehicle communication port in accordance with one or more embodiments of the invention.

FIG. 2 shows a connected vehicle communication port (100) and the specific hardware housed by the connected vehicle communication port (100) for UGDO functionality in accordance with one or more embodiments of the invention. More specifically, FIG. 2 illustrates an embodiment of the invention in which the connected vehicle communication port (100) is designed as a standalone UGDO module (215), capable of supporting UGDO functionality alone. In other words, the connected vehicle communication port (100) of FIG. 2 does not include other vehicle subsystem functionality, but rather, is designed to house all or a portion of only UGDO functionality.

Specifically, the standalone UGDO module (215) housed in the connected vehicle communication port (100) may include, in one or more embodiments, a UGDO controller (210), a sub GHz transceiver (212), a Bluetooth transceiver (214), antennas (215, 216) corresponding to each of the transceivers, and a vehicle interface (213). Each of the aforementioned components is described in detail below. Those skilled in the art will appreciate that embodiments of the invention are not limited to the configuration shown in FIG. 2. Specifically, one or more components that enable UGDO functionality may be located outside the connected vehicle communication port (100), combined with another UGDO component, or omitted without department from the scope of the invention.

The UGDO controller (210) is a microcontroller of any type that is suitable for the implementation of the present disclosure, including but not limited to a general purpose processor, dedicated processor, microprocessor, digital signal processor or any multi-core processor. The UGDO controller (210) may be an analog or a digital communications processor. Although only one microcontroller is illustrated in FIG. 2, a plurality of different microcontrollers may be present in the UGDO module. The UGDO controller (210) is configured to control the transceivers (212, 214) and process any data exchanged between the transceivers (212, 214) via the antennas (215, 216) and other vehicle subsystems that may be outside the connected vehicle communication port (100).

In one or more embodiments of the invention, the UGDO controller (210) may be located at a different location than the connected vehicle communication port (100). For example, UGDO controller (210) may be combined with another microcontroller of a separate vehicle subsystem located in an interior of the vehicle (110), while the connected vehicle communication port (100) is located on the fuselage of the vehicle.

The Sub GHz transceiver (212) is a radio frequency (RF) module, configured to operate below 1 GHz frequency, for communication exchange with other UGDO components and/or other vehicle subsystems. More specifically, for example, the Sub GHz transceiver (212) may operate at 27 MHz, 30 MHz, 40 MHz, 315 MHz, 418 MHz, 434 MHz, and/or 868 MHz.

The Bluetooth transceiver (214) enables the vehicle on which the connected vehicle communication port (100) is disposed to send and receive data. The Bluetooth transceiver may send and receive data via antenna (216). Similarly, data may be received by the Bluetooth transceiver (214) by antenna (216) and the Bluetooth transceiver (214) may transmit the received data to the ECU of one or more vehicle subsystems. Those skilled in the art will appreciate that the Bluetooth transceiver (214) may substituted by any Wi-Fi transceiver capable of facilitating wireless communication for the vehicle.

While both transceivers (212, 214) are used in some embodiments to ensure a high compatibility rate with existing GDOs (many of them are working with the Sub-GHz transceiver while the more recent ones work with Bluetooth/WiFi), those skilled in the art will appreciate that both transceivers (212, 214) may be shared for other purposes. For example, the Sub-GHz communication is usually used for RKE and TPMS purposes (receiver only in most cases), the Bluetooth WiFi can also be shared for comfort application within the vehicle (HandsFreePhone) or outside the vehicle (for passive entry or remote controlled functions).

The first antenna (216) operably connected to the sub GHz transceiver may be a physical device configured to radiate electromagnetic radiation in response to an applied voltage having a first frequency. The first antenna may be a monopole-type antenna or a dipole antenna including a printed circuit board having at least one conducting patch. In one or more embodiments of the invention, the first antenna may use the bottom plane of the connected vehicle communication port housing as a ground plane. In other embodiments of the invention, the first antenna may utilize the fuselage of a vehicle as a ground plane. The size and shape of the at least one conducting patch may be proportional to a wavelength associated with the first frequency of the applied voltage. In response to the applied voltage, the first antenna (216) may radiate vertically polarized radiation due to the first antenna (216) being a monopole-type antenna. In one or more embodiments, the first antenna (216) may be packaged on the same printed circuit board assembly (PCBA) as the sub GHz transceiver (212). Alternatively, in one or more embodiments, the first antenna (216) may be physically separate from the sub GHz transceiver (212). For example, the first antenna may be disposed in the connected vehicle communication port (100), while the transceiver (212) is disposed outside of the connected vehicle communication port (100).

The second antenna (217) operably connected to the Bluetooth transceiver (214) may be a physical device configured to radiate electromagnetic radiation in response to an applied voltage having a second frequency. The second antenna may be a planar-type antenna including a printed circuit board having at least one conducting patch. The second antenna may be, for example, a patch antenna or a planar inverted-F antenna. In one or more embodiments of the invention, the second antenna may use the bottom plane of the connected vehicle communication port (100) as a ground plane. In response to the applied voltage, the second antenna may radiate horizontally polarized radiation due to the second antenna being a planar-type antenna. In one or more embodiments, the second antenna (217) may be packaged on the same printed circuit board assembly (PCBA) as the Bluetooth transceiver (214). Alternatively, in one or more embodiments, the second antenna (216) may be physically separate from but proximate to the Bluetooth transceiver (214). For example, the second antenna may be disposed in the connected vehicle communication port (100), while the Bluetooth transceiver (214) is disposed outside of the connected vehicle communication port (100). Such hardware components may be soldered onto the PCBA or connected to the PCBA in other well-known ways.

While the first antenna (216) and second antenna (217) have been described as metallic structures, one of ordinary skill in the art will appreciate that an antenna structure may include and/or be comprised of non-metallic materials. An antenna may include semiconducting or insulating materials without departing from the invention. The non-metallic materials perform different functions than metallic materials such as, for example, absorbing radiation but also may perform the same function as metallic materials such as, for example, transmitting, directing, and/or radiating electromagnetic radiation without departing from the invention. Further, although the antennas (216, 217) are depicted with the same fork shape symbol, those skilled in the art will appreciate that the first and second antennas may be different from each other.

In one or more embodiments, the vehicle interface (213) is configured to receive the UGDO signal from user input via the human-machine interface (HMI) (211). In the case of the standalone integration as shown in FIG. 2, the vehicle interface (213) may be restricted to the HMI, because no other vehicle subsystem is needed to execute the function. That is, the vehicle interface (213) may only provide a communication path between the UGDO and the corresponding HMI. With respect to the vehicle interface (213), communication with the HMI (211) may be local interconnect network (LIN) or analog. Those skilled in the art will appreciate that the communication protocol between the UGDO module and the HMI (211) is not limited to the aforementioned types, but may include any other suitable communication protocol such as CAN bus, digital communication, etc. Those skilled in the art will appreciate that certain communication protocols used for UGDO functionality may be used for other purposes as well. For example, in the case of LIN, the bus may also be used to communicate data that is exchanged between other modules connected on the same node.

Figure 3:
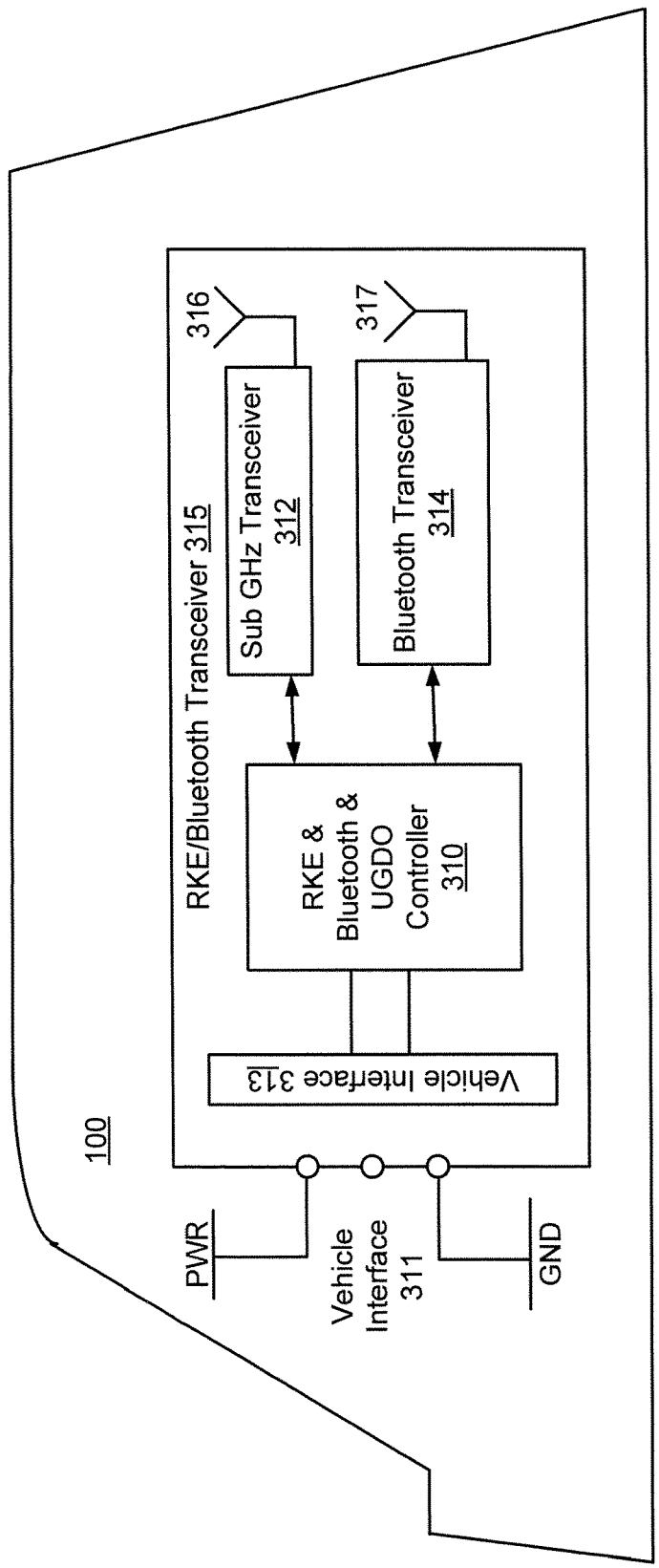
FIG. 3 is shows an existing Bluetooth transceiver augmented to support UGDO functionality in accordance with one or more embodiments of the invention.

FIG. 3 shows an example of an existing Wi-Fi transceiver augmented to support UGDO functionality in accordance with one or more embodiments of the invention. In other words, in one or more embodiments, another PCBA module that is already embedded in a vehicle subsystem, i.e., an existing remote keyless entry (RKE) module that may be already incorporated into a connected vehicle communication port (100), may be modified to include UGDO functionality. The embodiment of FIG. 3 may be one of many alternatives to having a standalone UGDO module as shown in FIG. 2 and described above.

Although not shown in FIG. 3, the RKE module may include an RKE user terminal carried by the user and a RKE electronic control unit (ECU) installed within the vehicle. In one or more embodiments, the RKE/Bluetooth/UGDO controller (310) shown in FIG. 3 may be a part of such an ECU. The RKE ECU may be equipped with or connected to a RF receiver to receive signals from the RKE user identifier terminal and control vehicle operations, such as locking/unlocking doors, or starting the engine of the vehicle. In addition, the RKE ECU may be configured to authenticate the RKE user identifier terminal. In some cases, for improved security authentication or to display vehicle data on a handheld identifier terminal display (if any), RKE function may require a bi-directional communication between the handheld identifier device and the vehicle, resulting in a radio frequency transceiver upscale. Specifically, the upscale may consist of changing the RF receiver IC (most of the RKs) into a transceiver IC that allows bi-directional transmissions.

Those skilled in the art will appreciate that the components of the RKE/Bluetooth module/subsystem (315) may include the same functionality described in FIG. 2 above with respect to the same-named components. In one or more embodiments, in order to augment the RKE/Bluetooth module (315) to support UGDO functions, some minimal changes to the existing RKE/Bluetooth module may be made. For example, in one or more embodiments, the sub-GHz transceiver (312) may be adapted to operate bi-directionally at several frequencies below 1 GHz, because typically, only one frequency is used for RKE functions.

In addition, the RKE/Bluetooth controller (310) managing the RKE functions may be upgraded to include the UGDO capability. For example, the controller (310) may be modified to process garage door signals directed to the transceivers (312, 314) from an HMI of the vehicle, communicate upon request with the garage door receiver and control the garage door for opening or closing. Further, the controller must be able to distinguish signals from the RKE subsystem and the UGDO subsystem. This may be done by assigning the different signals different unique IDs, or different carrier frequencies/frequency ranges, or any other method.

The vehicle interfaces (311, 313) may also be modified to accommodate the HMI commands to be transferred to the RKE/Bluetooth/UGDO transceivers (312, 314). In the embodiment of FIG. 3, the vehicle interfaces (311, 313) may be configured to communicate via LIN, CAN bus, Flexray, Ethernet and/or low-voltage differential signaling (LVDS) when the RKE/Bluetooth/UGDO module controls a camera. In one or more embodiments, vehicle interface 311 may be only a data communication bus (partial interface (I/F)) and vehicle interface 313 may include the module power supplies (full I/F). In one or more embodiments, the two vehicle interfaces may be combined into one full interface.

Those skilled in the art will appreciate that the changes to be made to support UGDO functionality using an existing RKE/Bluetooth module (315) may be minimal because some of the hardware elements that enable for UGDO functionality is already present in the RKE/Blueooth module (315). That is, both transceivers (312, 314), controller (310), and vehicle interface (313) may already exist in the implemented RKE/Bluetooth module, and thus, minimal changes to the existing hardware, and changes via software, may be sufficient to implement UGDO functions. For example, the RKE/Bluetooth controller (310) may implement UGDO operations by processing the computer program instructions associated with UGDO functions stored in the memory (not shown) coupled to or embedded within the controller (310).

In addition, although FIG. 3 shows a RKE/Bluetooth module (315) augmented to support UGDO functionality, the UGDO functionality may be integrated into any suitable existing vehicle subsystem, such as, for example, a GPS receiver, a VSX (Satellite radio) module, a TPMS (tire pressure monitoring subsystem) module, or any other suitable vehicle subsystem capable of supporting the hardware required for UGDO functionality. More specifically, if for example the UGDO functionality is integrated into a TPMS module, functional redundancies may be less obvious: the vehicle interface and controller may be re-used together with the sub-GHz transceiver hardware but the Bluetooth/Wi-Fi transceiver for full UGDO function coverage may need to be added.

Further, although the RKE/Bluetooth module (315) is shown as being embedded in the connected vehicle communication port (100) in FIG. 3, those of ordinary skill in the art will appreciate that the RKE/Bluetooth module (315) may be disposed outside of the connected vehicle communication port (100), and be located elsewhere nearby vehicle communication port (100). An example of such an implementation of embodiments of the invention is shown in FIG. 4.

Figure 4:
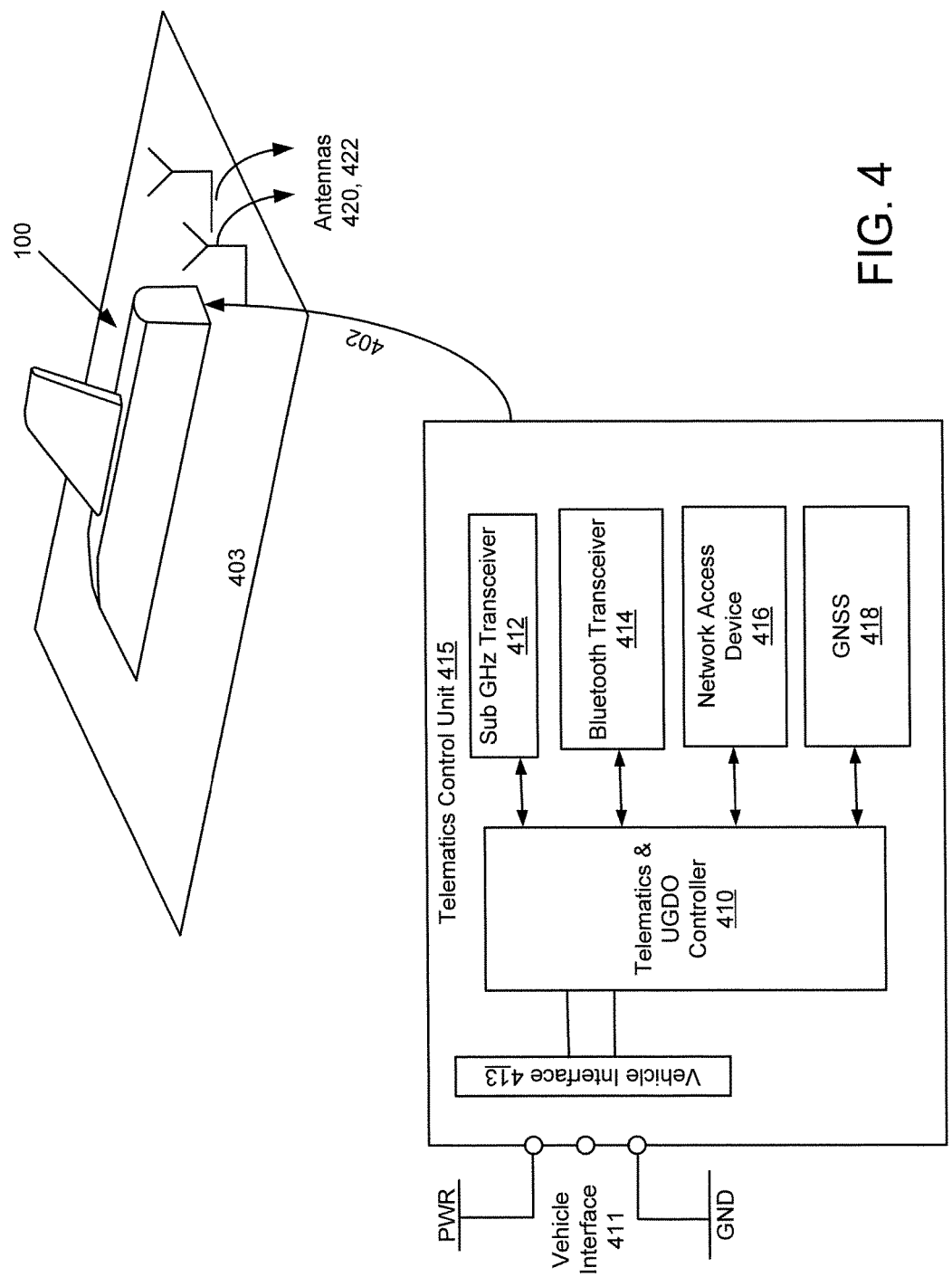
FIG. 4 shows a telematics control unit (TCU) augmented to support UGDO functionality in accordance with one or more embodiments of the invention.

FIG. 4 shows another example of integrating the UGDO functionality in an existing vehicle subsystem located outside of but in physical proximity to the connected vehicle communication unit (100) in accordance with one or more embodiments of the invention. Specifically in FIG. 4, the UGDO functionality is integrated into an existing telematics control unit (TCU) (415). The embodiment of FIG. 4 may be one of many alternatives to having a standalone UGDO module as shown in FIG. 2 and described above.

The TCU (415) is a vehicle subsystem embedded on board the vehicle that provides connectivity to a mobile phone network and/or the cloud. More specifically, the TCU (415) may be considered as a vehicle embedded mobile phone with a specific phone number but without any HMI capability (in one example, the HMI may be located in a location within the vehicle, but not adjacent to the TCU). One of the primary functions of the telematics control unit is to enable automated emergency phone call in case of an emergency or a crash. The TCU may be used by extension to communicate data through the cloud. In other cases, the TCU may enable remote maintenance of the vehicle components (e.g., download software update for any component that can be re-flashed in the vehicle). The functional implementations of the TCU are nearly infinite.

In one or more embodiments, the TCU (415) may have one or more of a global navigation satellite system (GNSS)

(418), a vehicle interface for communication with other vehicle subsystems (411, 413), an external interface for mobile communication via the network access device (416) (e.g., an LTE antenna), a microcontroller (410) for processing the GNSS signals, or a Wi-Fi/Bluetooth transceiver (414) for wireless communication exchange with remote objects. Those skilled in the art will readily appreciate that although not shown in FIG. 4, the TCU (415) may also include memory coupled to or embedded within the controller (410) for storing GPS values and/or vehicle sensor data.

In one or more embodiments, the sub GHz transceiver (412) may be a hardware component that is added to the TCU (415) in order for the TCU (415) to support UGDO functionality. Specifically, the TCU (415) may be upgraded to include transceiver (412), capable of bi-directional communication, at several frequencies below 1 GHz. In addition, the telematics and UGDO controller (410) may be augmented to control and process signals to and from the sub GHz transceiver (412) and to manage UGDO functions. Software and/or firmware to support UGDO functionality may also be added to the TCU controller (410).

In the embodiment of FIG. 4, only the antennas (420, 422) of the UGDO transceivers (412, 414) are located in the connected vehicle communication port (100) on the fuselage (403) of the vehicle, while the rest of the electronics are embedded in the TCU (415). Although only two antennas are shown, there may be any number of antennas in the connected vehicle communication port (100) without departing from the scope of the invention. For example, the antennas of all of the components of the TCU (415), including the GNSS (418) and the network access device (416) may be located in the connected vehicle communication port (100). Further, in FIG. 4, the UGDO HMI may be an independent module communicating with the TCU (415) integrating the UGDO transceiver using a vehicle network (e.g., CAN bus, LIN, etc.).

In one or more embodiments, the TCU (415) may be an independent vehicle subsystem disposed outside of the connected vehicle communication port (100). More specifically, the TCU (415) may be disposed in the interior of the vehicle, under the roof of the vehicle, and may communicate with the connected vehicle communication port (100) via communication link (402). Communication link 402 is a wired link (e.g., coaxial cables). In one or more alternate embodiments, the TCU (415) may be located in a interior rearview mirror, a camera subsystem, or any other suitable vehicle module located on the exterior or interior of the vehicle. In one or more embodiments, the TCU (415) is physically near the connected vehicle communication port (100). This may mean that the TCU (415) is within a certain range distance (e.g., below 350 mm, or a maximum of 500 mm away) from the connected vehicle communication port (100).

Figure 5:
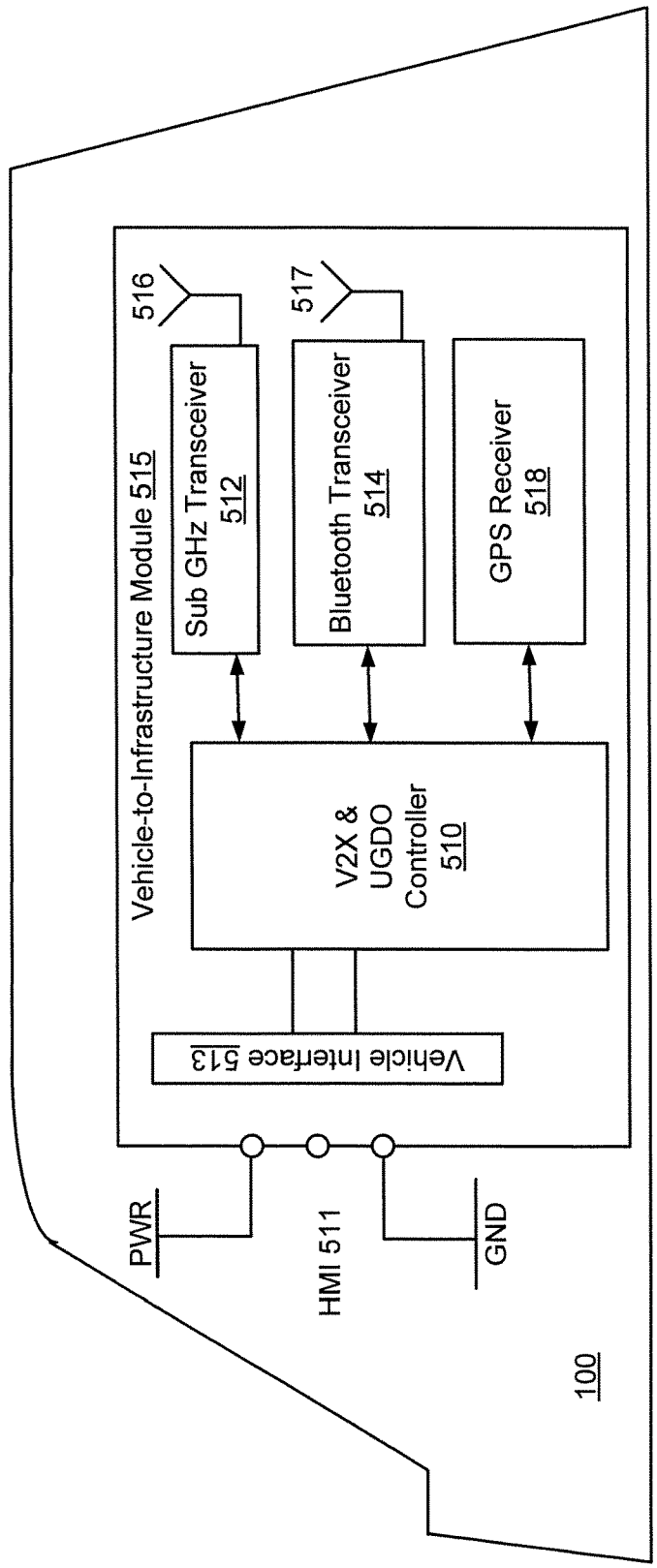
FIG. 5 shows a vehicle-to-infrastructure (V2X) module augmented to support UGDO functionality in accordance with one or more embodiments of the invention.

FIG. 5 shows an alternate embodiment to FIG. 3 in accordance with one or more embodiments, in which the vehicle subsystem augmented to include UGDO functionality is a vehicle-to-infrastructure module (V2X) (515). The V2X module (515) coordinates behaviors of a group of vehicles by gathering global and/or local information on traffic and road conditions, and then suggesting or imposing certain rules. For example, velocities and accelerations of vehicles and intervehicle distances may be suggested by the infrastructure (and received by the V2X module (515)) on the basis of traffic conditions, with a goal of optimizing emissions, fuel consumption, and traffic velocities. The V2X module may also include functionality to broadcast suggested routes, behaviors, etc. to vehicles via road displays or directly via wireless connections.

To facilitate all of the above functions, the V2X module (515) may include, for example, a V2X controller (510), dedicated transceivers and corresponding antennas, a GPS receiver (518), and a vehicle interface (513). As described above, the V2X module (515) may be augmented to integrate UGDO functionality by adding UGDO controller functionality to the V2X controller (510), and by adding sub-GHz and Bluetooth/Wi-Fi transceivers (512, 514) and corresponding antennas (516, 517). Also, in one or more embodiments, the vehicle interface (513) may be modified to cover several functions that involve other vehicle modules. The vehicle interface (513) is configured to exchange signals with the HMI 511 for receipt of user input to open/close a garage door.

Figure 6:
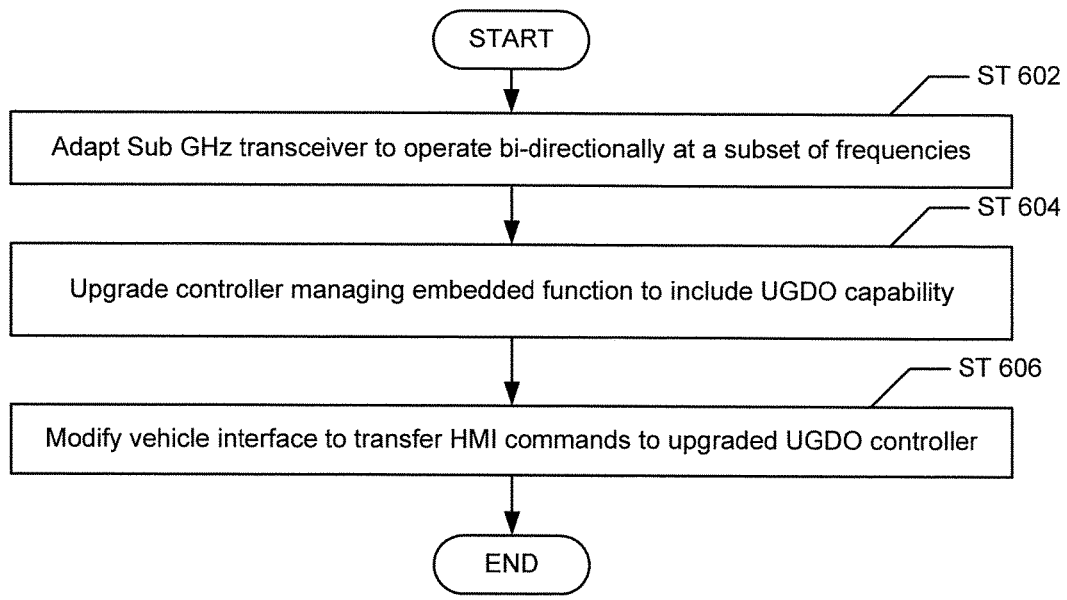
FIGS. 6 and 7 show flow charts in accordance with one or more embodiments of the invention.

FIG. 6 shows a flowchart for augmenting an existing connected vehicle communication port for a vehicle subsystem to support UGDO functionality, in accordance with one or more embodiments of the invention. FIG. 6 may thus apply to one or more of the embodiments described above with respect to FIGS. 3 through 5. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively.

Initially, in step 602, an existing sub GHz transceiver may be adapted to operate bi-directionally at a subset of frequencies below 1 GHz. In one or more embodiments, when an existing vehicle subsystem includes a sub GHz transceiver, this transceiver may only operate at one frequency for the specific function of the existing vehicle subsystem. For example, in the embodiment of FIG. 2, typically only one frequency is used for RKE/TPMS vehicle subsystem functions, and thus, the existing sub GHz transceiver may be modified in step 602 to operate at more than a single frequency, and to support bi-directional communication.

In step 604, the controller (microprocessor) managing the vehicle subsystem function is upgraded to include UGDO capability. This may include for example, including software for the controller to interpret a user input via HMI to open/close a garage door, supporting communication exchange between the vehicle interface and the controller, etc. Specifically, the upgrades made to the controller may be a software module that supports (1) the transceiver operations and protocols to support communication with various GDOs including identification; (2) a 'training' sequence that supports a specific handheld remote device; and (3) a communication method with the HMI module (e.g., a LIN network management and a LIN matrix for the LIN communication protocol). In addition, the capability to support a new type of GDO that may be added at a later time to the existing system is also considered in the software module upgrade. The UGDO software may be upgraded to support the new system communication and eventually the new 'training' sequence, if not known already. In step 606, the vehicle interface is modified to transfer HMI commands to the upgraded UGDO controller. Specifically, when a user pushes a button or inputs a command via the HMI, the vehicle interface is modified to be able to take the input signal from the HMI and transmit the signal to the upgraded microcontroller, which then processes the signal and controls the transceivers to carry out the UGDO function.

Those skilled in the art will appreciate that when an existing vehicle subsystem module, such as a V2X or a Satellite Radio module is augmented to support UGDO functionality, one or more hardware components may be added to the PCBA of the existing vehicle subsystem module. As described above, one or both of the sub GHz transceiver and the Wi-Fi transceiver may be added. However, in one or more alternate embodiments, a software-only integration of UGDO functionality may also be another way for an existing vehicle subsystem to support UGDO functionality. That is, where all the hardware (e.g., transceivers) required for UGDO functions is present either in one vehicle subsystem or distributed across multiple vehicle subsystems that are able to communicate with each other, UGDO functionality may be implemented by a software-only solution. Thus, augmenting one or more existing vehicle subsystems, which may or may not include a connected vehicle communication port, with computer programming instructions to perform UGDO functionality may be another mechanism for achieving embodiments disclosed herein that does not depart from the scope of the invention.

Figure 7:
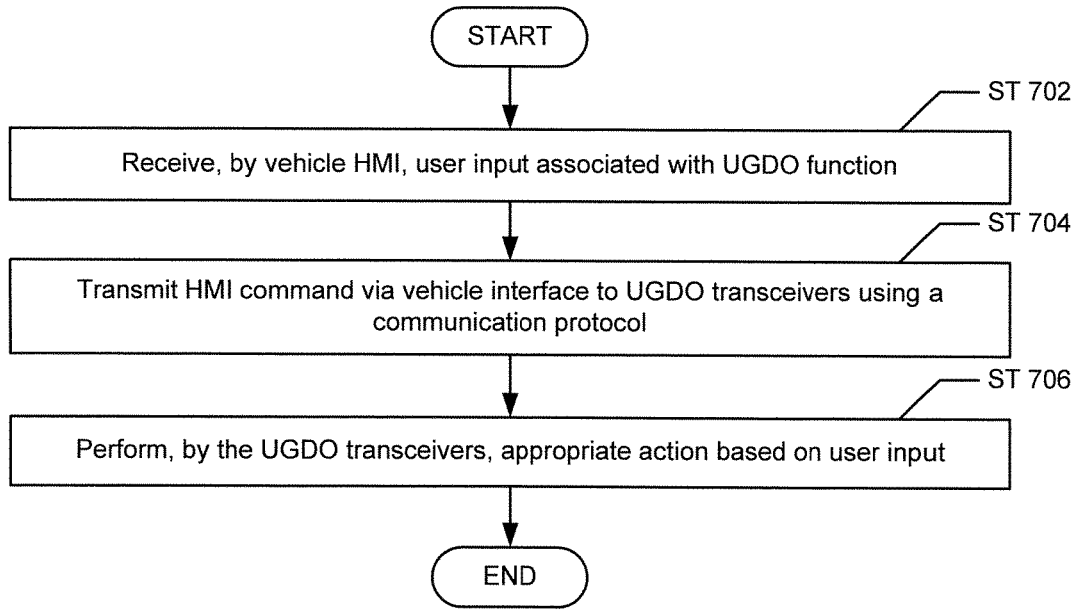

FIG. 7 shows a flow chart for using the UGDO functionality embedded in a connected vehicle communication port, in accordance with one or more embodiments of the invention. In step 702, a vehicle HMI receives a user input associated with a UGDO function. For example, the user may touch a display screen, push a button, voice a command, etc. using a HMI input to initiate a command for a UGDO function. The HMI command is transmitted, via the vehicle interface, to the UGDO transceivers using a suitable communication protocol in step 704. The communication protocol used in step 704 may depend on which protocols are supported by the vehicle interface, and/or whether a vehicle subsystem has been augmented to support UGDO functions or whether the UGDO functions are implemented in a standalone connected vehicle communication port. For example, the communication protocol may be analog, digital, CAN bus, LIN, Flexray, Ethernet, low-voltage differential signaling (LVDS), or any other suitable communication protocol, now known or later developed.

Upon receiving signal from the UGDO controller, the UGDO transceivers may perform one or more appropriate actions in response to the received signal. For example, the UGDO transceivers may open a garage door, close a garage door, stall a garage door, lock/unlock a garage door, etc. Those skilled in the art will appreciate that the aforementioned actions may not be limited to operation of a residential garage door. For example, the UGDO transceivers may be configured to provide remote control of any suitable access system, such as lift/open a gate blocking a commercial garage entrance, set an alarm, open a window, remotely control lighting, or any other comfort accessory that may be remotely controlled.

One of ordinary skill in the art will appreciate that numerous variations of embodiments of the invention are possible including varying the number and/or location of connected vehicle communication ports, which vehicle subsystems having ECUs or microcontrollers are augmented to support UGDO functionality, and/or the location of the components that facilitate UGDO functionality, without departing from the invention. Additionally, the shape of the connected vehicle communication port (100) may take forms other than those shown in FIGS. 1A-1B without departing from the scope of the invention.

By moving the UGDO functionality into a connected vehicle communication port, such as a SharkFin antenna located on the fuselage exterior of the vehicle, embodiments of the invention provide optimum radio performance, because the RF antenna is located outside the vehicle chassis. This allows for maximum range of the RF signals. Further, embodiments of the invention embed UGDO functionality into a standalone or existing connected vehicle communication port without the use or need for costly coaxial cables. When other functions using the same antennas area already located in the connected vehicle communication port, redundant antennas are avoided in the cases where an existing connected vehicle communication port of a vehicle subsystem is augmented to support UGDO functionality.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle control system for a vehicle, comprising:
a sharkfin antenna positioned exterior to and on a roof of the vehicle, the sharkfin antenna comprising at least one vehicle subsystem module comprising:
   a first transceiver;
   a microcontroller operable to control the first transceiver; and
   a vehicle interface configured to exchange signals between the microcontroller and the at least one vehicle subsystem,
wherein the at least one vehicle subsystem module is augmented to comprise universal garage door opener (UGDO) functionality by:
   embedding a second transceiver into the sharkfin antenna,
   adapting the first transceiver to operate bi-directionally at a plurality of frequencies below 1 GHz,
   upgrading the microcontroller to include UGDO functionality and to communicate with the second transceiver, and
   modifying the vehicle interface to accommodate a human-machine interface (HMI) command to be transferred to the vehicle subsystem module.

2. The vehicle control system of claim 1, wherein the vehicle subsystem module comprises one selected from a group consisting of: a remote keyless entry (RKE) module and vehicle-to-infrastructure module (V2X), a vehicle-to-vehicle module (V2V), a Bluetooth/WiFi hotspot module, a satellite radio module, a GPS module, and a Tire Pressure Monitoring System (TPMS) module.

3. The vehicle control system of claim 2, wherein the vehicle interface communicates with the vehicle subsystem module using one selected from a group consisting of: local interconnect network (LIN), controller area network (CAN) bus, Flexray, Ethernet, and low-voltage differential signaling (LVDS).

4. The vehicle control system of claim 1, wherein the first transceiver comprises a radio frequency (RF) sub-GHz transceiver and the second transceiver comprises a Bluetooth/Wi-Fi transceiver.

5. The vehicle control system of claim 1, wherein upgrading the microcontroller to include UGDO functionality comprises: adding transceiver operations and protocols to support communication with various GDOs, adding a 'training' sequence that supports a specific handheld remote device for a garage door; and adding a communication method for communication with an HMI subsystem.

6. The vehicle control system of claim 5, wherein the communication method is a LIN network management and a LIN matrix for the LIN communication protocol.

7. A vehicle control system for a vehicle, comprising:
a telematics control unit (TCU) capable of universal garage door opener (UGDO) functionality, comprising:
one or more transceivers configured to transmit and receive UGDO data via one or more antennas;
a microcontroller operable to control the one or more transceivers to implement the UGDO functionality; and
a vehicle interface configured to exchange signals between the microcontroller and at least one vehicle subsystem of the vehicle;
a connected vehicle communication port separate from the TCU operably connected to the vehicle, comprising:
the one or more antennas corresponding to the one or more transceivers, wherein the TCU is mounted in the vehicle in physical proximity to the connected vehicle communication port.

8. The vehicle control system of claim 7, wherein the at least one vehicle subsystem is a human-machine interface (HMI) system.

9. The vehicle control system of claim 8, wherein the HMI system communicates with the microcontroller operating the one or more transceivers using the vehicle interface.

10. The vehicle control system of claim 9, wherein the vehicle interface is a controller area network (CAN) bus or Ethernet LAN.

11. The vehicle control system of claim 7, wherein the one or more transceivers comprise one selected from a group consisting of: a radio frequency (RF) sub-GHz transceiver and a Bluetooth/Wi-Fi transceiver.

12. The vehicle control system of claim 7, wherein the connected vehicle communication port is positioned exteriorly on a roof of the vehicle.

* * * * *